Figure 1:
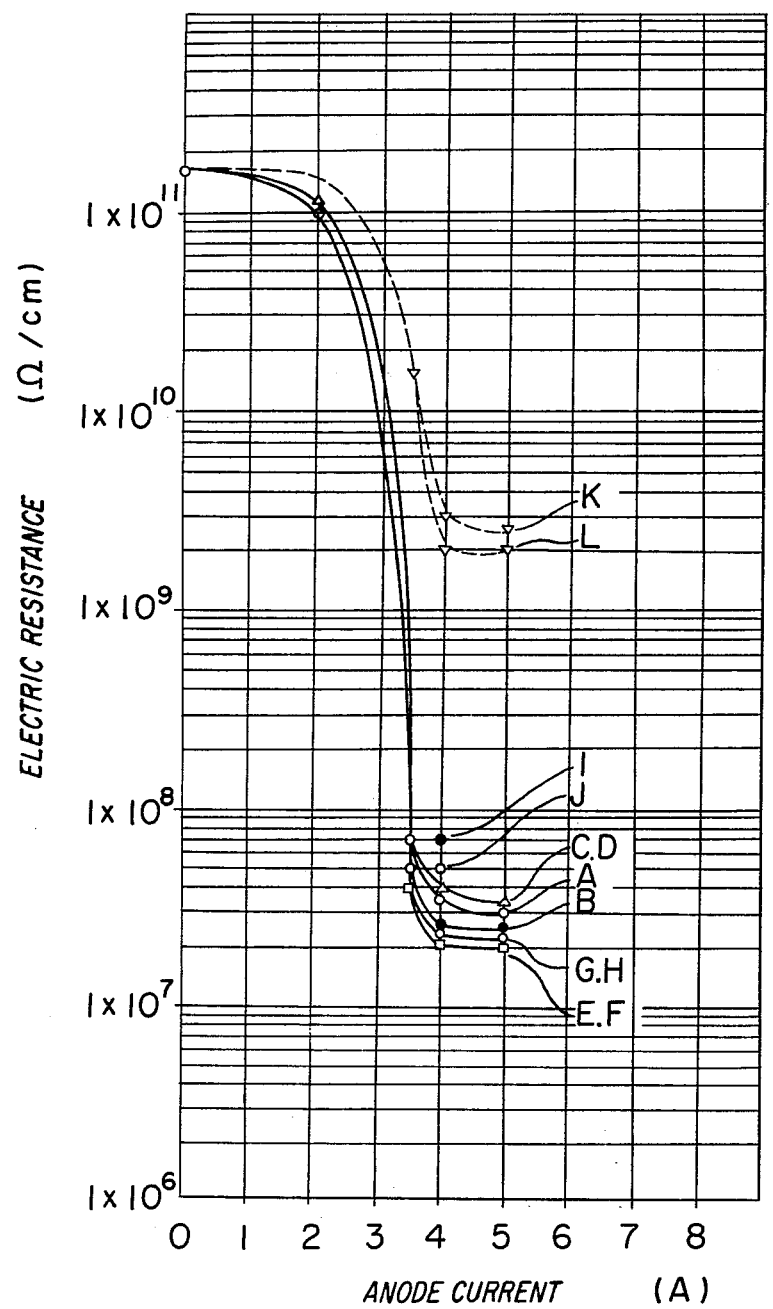

United States Patent [19]

Hosaka et al.

[11] Patent Number: 4,459,319
[45] Date of Patent: Jul. 10, 1984

[54] PROCESS FOR PRODUCING A MAGNETIC RECORDING MEDIUM

[75] Inventors: Akihiko Hosaka; Kiyotaka Okuyama; Kiyoto Kanazawa, all of Tokyo, Japan

[73] Assignee: TDK Corporation, Tokyo, Japan

[21] Appl. No.: 513,349

[22] Filed: Jul. 13, 1983

[30] Foreign Application Priority Data

Sep. 17, 1982 [JP] Japan ................................ 57-161050

[51] Int. Cl.$^3$ ............................................. B05D 3/06
[52] U.S. Cl. ........................................ 427/40; 427/41; 427/128; 427/129; 427/130; 427/132
[58] Field of Search ................... 427/40, 41, 128, 129, 427/130, 132

Primary Examiner—Bernard D. Pianalto
Attorney, Agent, or Firm—Oblon, Fisher, Spivak, McClelland & Maier

[57] ABSTRACT

A process for producing a magnetic recording medium, which comprises dispersing a ferromagnetic powder in a binder to form a magnetic coating composition and applying the magnetic coating composition onto a film base support to form a magnetic layer thereon, wherein corona discharge treatment is applied after the application and drying the magnetic coating composition on the film base support.

3 Claims, 1 Drawing Figure

PROCESS FOR PRODUCING A MAGNETIC RECORDING MEDIUM

The present invention relates to a process for producing a magnetic recording medium. More particularly, the present invention relates to a process for producing a magnetic recording medium wherein corona discharge treatment is applied to obtain a magnetic recording medium having excellent conductivity and good electromagnetic and magnetic properties.

In general, a magnetic recording medium comprises a film base support such as a polyester resin film and a magnetic layer formed thereon. This magnetic layer has a construction such that a great amount of magnetic powder is bonded by less amount of a binder resin and additives. However, the magnetic layer of this type has poor conductivity and relatively high surface electric resistance, whereby it tends to be readily electrically charged. Therefore, there have been serious problems such that scratch noise is generated at the time of the discharge, the magnetic layer tends to adsorp a dust and magnetization of the magnetic head or dropout are likely to be caused.

To solve these problems, there have been proposed a method wherein a conductive powder or an antistatic agent is incorporated in the magnetic layer, and a method wherein a conductive layer in which these additives are uniformly dispersed, is provided between the base support and the magnetic layer. However, if a conductive powder such as carbon or fine metal powder is incorporated into the magnetic layer, the packing density or dispersibility of the magnetic powder tends to be inferior and consequently there will be undesirable phenomena such as a decrease of the electromagnetic conversion characteristic or an increase of the noise. On the other hand, in the case where a conductive layer with these additives uniformly dispersed therein is provided between the base film as the support and the magnetic layer, the adhesion between the conductive layer and the support or between the conductive layer and the magnetic layer tends to be deteriorated by the conductive powder dispersed in the conductive layer, and in the worst case, cracking or roughening of the magnetic layer may be led.

The present inventors have conducted various researches to overcome these drawbacks and finally found that the electric resistance of the magnetic recording medium can readily be decreased by applying corona discharge treatment after the application and drying of the magnetic coating composition on the film base support. The present invention has been accomplished based on this discovery.

Thus, the present invention provides a process for producing a magnetic recording medium, which comprises dispersing a ferromagnetic powder in a binder to form a magnetic coating composition and applying this magnetic coating composition onto a film base support to form a magnetic layer thereon, wherein corona discharge treatment is applied after the application and drying of the magnetic coating composition on the base support. In the present invention, the corona discharge treatment after the application and drying of the magnetic coating composition may be applied against the surface of the magnetic layer or the surface of the base support. In either case, substantially the same effect can be obtained.

BRIEF AND DETAILED DESCRIPTION OF THE FIGURE

The FIGURE is a graph showing the electric resistance of the samples treated by the corona discharge treatment according to the present invention.

According to the process of the present invention, the electroconductivity of the magnetic recording medium can be considerably improved even without using the above-mentioned conductive powder or the like. Namely, the present invention makes it possible to prepare a magnetic recording medium having superior electroconductivity without providing a conductive layer with a conductive powder dispersed therein between the base support and the magnetic layer or without back-coating such a conductive layer (i.e. providing a conductive layer on the surface opposite to the surface of the magnetic layer), or without incorporating a conductive powder into the magnetic coating composition, as has been done in the prior art. Further, in the present invention, no conductive powder is used, and the magnetic recording medium thereby prepared has advantages that the electromagnetic and magnetic properties will not be impaired.

Now, the present invention will be described in detail with reference to Examples.

EXAMPLE 1

| | |
|---|---|
| Ferromagnetic metal powder (Fe—Co—Ni) | 2,000 parts by weight |
| Polyurethane resin | 300 parts by weight |
| Vinyl chloride/vinyl acetate copolymer | 200 parts by weight |
| Dispersing agent | 40 parts by weight |
| Lubricant | 30 parts by weight |
| Methyl ethyl ketone | 1,800 parts by weight |
| Methyl isobutyl ketone | 600 parts by weight |
| Cyclohexanone | 600 parts by weight |

The above components were thoroughly mixed and dispersed in a paint-dispersing machine, and then polyisocyanate was added as a cross-linking agent in an amount of 10% by weight relative to the resin components. Then, the mixture was uniformly admixed to obtain a magnetic coating solution. This magnetic coating solution was coated on a polyester film base having a thickness of 15 μm in a thickness of from about 3 to 6 μm and then dried. The polyester film having a magnetic layer thus formed was subjected to corona discharge treatment by gradually changing the anode current at a power source voltage of 200 V and an anode voltage of 100 V. In this manner, a sample to which the corona discharge treatment was applied from both sides of the magnetic layer and a sample to which the corona discharge treatment was applied from both sides of the base support, were prepared. The former was designated as Sample A, and the latter was designated as Sample B. These samples were subjected to super calendar treatment, and then cut in a predetermined width to obtain test samples.

EXAMPLE 2

Test samples were prepared under the same conditions as in Example 1 except that no polyisocyanate as the cross-linking agent was added. The sample to which the corona discharge treatment was applied from both sides of the magnetic layer, was designated as Sample C, and the sample to which the corona discharge treatment was applied from both sides of the base support, was designated as Sample D.

EXAMPLE 3

Test samples were prepared under the same conditions as in Examples 1 and 2 except that the corona discharge treatment was conducted after the calendaring treatment. In the case where Example 1 was followed, the sample to which the corona discharge treatment was applied from both sides of the magnetic layer was designated as Sample E, and the sample to which the corona discharge treatment was applied from both sides of the base support was designated as Sample F. In the case where Example 2 was followed, the sample to which the corona discharge treatment was applied from both sides of the magnetic layer, was designated as Sample G, and the sample to which the corona discharge treatment was applied from both sides of the base support, was designated as Sample H.

EXAMPLE 4

| | |
|---|---|
| Ferromagnetic metal powder (Fe—Ni—Co) | 2,000 parts by weight |
| Polyurethane resin | 250 parts by weight |
| Epoxy resin | 150 parts by weight |
| Nitrocellulose | 100 parts by weight |
| Dispersing agent | 40 parts by weight |
| Lubricant | 25 parts by weight |
| Abrasive | 60 parts by weight |
| Methyl ethyl ketone | 1,800 parts by weight |
| Methyl isobutyl ketone | 600 parts by weight |
| Cyclohexanone | 500 parts by weight |

In the same manner as in Example 1, a magnetic coating composition was prepared by using the above components, and then it was applied onto a polyester film base and dried. The polyester film having a magnetic layer thus formed was subjected to super calendar treatment. Then, corona discharge treatment was applied thereto at an anode current of 4 ampare. The sample to which the corona discharge treatment was applied from both sides of the magnetic layer, was designated as Sample I, and the sample to which the corona discharge treatment was applied from both sides of the base support, was designated as Sample J.

EXAMPLE 5

Test samples were prepared in the same manner as in Example 3 except that Co/γ-Fe$_2$O$_3$ was used as the magnetic powder and polyisocyanate was used as a cross-linking agent. The sample to which the corona discharge treatment was applied from both sides of the magnetic layer, was designated as Sample K, and the sample to which the corona discharge treatment was applied from both sides of the base support, was designated as Sample L.

COMPARATIVE EXAMPLE

Comparative samples were prepared in the same manner as in Examples 1 to 5 except that the anode current during the corona discharge treatment was set at 0 ampare.

The electric resistance of each of the various samples thus obtained was measured by a method in accordance with JIS C-6240 i.e. a measuring method for a magnetic recording medium. The results thereby obtained are shown in FIG. 1.

It is evident from FIG. 1 that all of the samples to which the corona discharge treatment was applied according to the present invention, are far superior, in their low electric resistance, to the comparative samples to which no such treatment was applied.

Further, from a further research, it has been confirmed that such an effect is obtainable with respect to all resins to be used for magnetic coating compositions. Furthermore, it has been confirmed that as the ferromagnetic powder, a wide range of magnetic powders such as iron oxide-type and alloy-type may effectively be used, but in the case where a ferromagnetic alloy powder is used, the effect is particularly distinct.

Having thus described the present invention, it should be apparent that the process of the present invention does not require complicated process steps involved in the use of a conductive powder in the prior art, and is capable of presenting a magnetic recording medium having superior electroconductivity.

We claim:

1. A process for producing a magnetic recording medium, which comprises dispersing a ferromagnetic powder in a binder to form a magnetic coating composition and applying the magnetic coating composition onto a film base support to form a magnetic layer thereon, wherein corona discharge treatment is applied after the application and drying the magnetic coating composition on the film base support.

2. The process according to claim 1, wherein the corona discharge treatment is applied against the surface of the magnetic layer.

3. The process according to claim 1, wherein the corona discharge treatment is applied against the base support.

* * * * *